(12) United States Patent
Ford

(10) Patent No.: US 11,549,604 B2
(45) Date of Patent: Jan. 10, 2023

(54) SYSTEMS AND METHODS FOR VENTING ENCLOSURE

(71) Applicant: Johnson Controls Technology Company, Auburn Hills, MI (US)

(72) Inventor: Scott Allen Ford, Spring Grove, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 169 days.

(21) Appl. No.: 16/650,360

(22) PCT Filed: Sep. 25, 2018

(86) PCT No.: PCT/US2018/052693
§ 371 (c)(1),
(2) Date: Mar. 24, 2020

(87) PCT Pub. No.: WO2019/067459
PCT Pub. Date: Apr. 4, 2019

(65) Prior Publication Data
US 2020/0232571 A1    Jul. 23, 2020

Related U.S. Application Data

(60) Provisional application No. 62/564,091, filed on Sep. 27, 2017.

(51) Int. Cl.
*F16K 15/14*   (2006.01)
*F24F 1/24*    (2011.01)

(52) U.S. Cl.
CPC .............. *F16K 15/147* (2013.01); *F24F 1/24* (2013.01)

(58) Field of Classification Search
CPC ..... F16K 15/147; F24F 1/24; F24F 2013/227; F24F 1/20; F24F 13/20
(Continued)

(56) References Cited

U.S. PATENT DOCUMENTS 2,643,282 A * 6/1953 Greene .................... H04B 1/03
                                                  165/104.31
6,422,255 B1 * 7/2002 Hartke ...................... F16K 1/34
                                                  137/12
(Continued)

FOREIGN PATENT DOCUMENTS

CN     2516867 Y    10/2002
DE    3146030 A1     5/1983
(Continued)

OTHER PUBLICATIONS

Japanese Office Action for JP Application No. 2020-517775, dated Jun. 22, 2021, 4 pgs.
(Continued)

*Primary Examiner* — Steve S Tanenbaum
(74) *Attorney, Agent, or Firm* — Fletcher Yoder, P.C.

(57) ABSTRACT

The present disclosure relates to an enclosure of a vapor compression system, where a component is disposed within the enclosure. The component is fluidly coupled to the vapor compression system and configured to discharge a flow of fluid. The enclosure includes a hole within a portion of the enclosure and a relief valve disposed within the hole of the enclosure, where the relief valve is configured to discharge the flow of fluid in a first direction through a passage within the relief valve. The passage extends from an interior region of the enclosure to an environment external of the enclosure. The relief valve is configured to block a second flow of fluid through the passage in a second direction, where the second direction is opposite of the first direction.

9 Claims, 8 Drawing Sheets

(58) Field of Classification Search
USPC .................................................... 62/259.2
See application file for complete search history.

(56) References Cited

U.S. PATENT DOCUMENTS

| | | |
|---|---|---|
| 6,448,637 B1 | 9/2002 | Studebaker |
| 2017/0176066 A1 | 6/2017 | Schreiber et al. |
| 2017/0252524 A1 | 9/2017 | Krüger |

FOREIGN PATENT DOCUMENTS

| | | |
|---|---|---|
| DE | 102011112576 A1 | 3/2013 |
| GB | 2322440 A | 8/1998 |
| JP | H10220828 A | 8/1998 |
| JP | 2001045601 A | 2/2001 |
| JP | 2003336953 A | 11/2003 |
| JP | 2008157587 A | 7/2008 |
| JP | 2015106491 A | 6/2015 |
| JP | 2017054865 A | 3/2017 |
| TW | 200929672 A | 7/2009 |
| WO | 2006064666 A1 | 6/2006 |
| WO | 2008111356 A1 | 9/2008 |
| WO | 2013051638 A1 | 4/2013 |

OTHER PUBLICATIONS

Chinese Office Action for ON Application No. 201880056551.6, dated Jul. 5, 2021, 3 pgs.
Korean Office Action for KR Application No. 10-2020-7011626, dated Sep. 16, 2021, 5 pgs.
Taiwan Office Action and Search Report for TW Application No. 107133924, dated Dec. 8, 2021, 7 pgs.
International Search Report and Written Opinion for PCT Application No. PCT/US2018/052693, dated Jan. 15, 2019, 15 pgs.
Japanese Office Action for JP Application No. 2021-172781, dated Aug. 18, 2022, 6 pages.

* cited by examiner

SYSTEMS AND METHODS FOR VENTING ENCLOSURE

CROSS-REFERENCE TO RELATED APPLICATIONS

This application is a U.S. National Stage Application of PCT International Application No. PCT/US2018/052693, entitled "SYSTEMS AND METHODS FOR VENTING ENCLOSURE," filed Sep. 25, 2018, which claims priority from and the benefit of U.S. Provisional Application Ser. No. 62/564,091, entitled "SYSTEMS AND METHODS FOR VENTING ENCLOSURE," filed Sep. 27, 2017, each of which is hereby incorporated by reference in its entirety for all purposes.

BACKGROUND

This disclosure relates generally to heating, ventilating, air conditioning, and refrigeration (HVAC&R) systems. Specifically, the present disclosure relates to venting an enclosure of a HVAC&R unit.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

A heating, ventilating, air conditioning, and refrigeration (HVAC&R) system may be used to thermally regulate (e.g., refrigerate) an environment (e.g., a building, home, or other structure). The HVAC&R system may include a vapor compression system, which includes heat exchangers such as a condenser and an evaporator that transfer thermal energy (e.g., heat) between the HVAC&R system and the environment. In many cases, an enclosure may be disposed adjacent to components of the vapor compression system, such as a motor. The enclosure may house various components, such as electrical components for controlling the motor. The components within the enclosure may be pressurized, and in some cases, fluid (e.g., refrigerant) may be discharged into the enclosure.

Typical enclosures may include a plurality of louvers (e.g., cut and/or stamped slots) within a cover plate of the enclosure. The louvers may vent the fluid within the enclosure to the environment. In some cases, the louvers may be expensive to produce, and may use an additional filter to prevent contaminants (e.g., dust) from flowing through the louvers and thus, into the enclosure.

SUMMARY

The present disclosure relates to an enclosure of a vapor compression system, where a component is disposed within the enclosure. The component is fluidly coupled to the vapor compression system and configured to discharge a flow of fluid. The enclosure includes a hole within a portion of the enclosure and a relief valve disposed within the hole of the enclosure, where the relief valve is configured to discharge the flow of fluid in a first direction through a passage within the relief valve. The passage extends from an interior region of the enclosure to an environment external of the enclosure. The relief valve is configured to block a second flow of fluid through the passage in a second direction, where the second direction is opposite of the first direction.

The present disclosure also relates to an enclosure for a vapor compression system having a component within the enclosure, where the component is fluidly coupled to the vapor compression system and configured to discharge a first flow of fluid at a first volumetric flow rate. The enclosure includes a relief valve disposed within a hole of the enclosure, where the relief valve includes an inlet portion and an outlet portion. The relief valve is configured to discharge a second flow of fluid in a first direction and block a third flow of fluid in a second direction opposite the first direction. The enclosure further includes a mounting bracket disposed above the relief valve and configured to couple the relief valve to the enclosure, where the mounting bracket includes an opening within the mounting bracket and the opening is disposed above the inlet portion of the relief valve.

The present disclosure also relates to an enclosure having a component disposed within an interior region of the enclosure, where the component includes one or more seals configured to maintain a pressure within the component. The seals are configured to rupture when the pressure within the component exceeds a threshold value, and the component is configured to discharge a flow of fluid into the interior region of the enclosure when the seals rupture. A relief valve disposed within a hole of the enclosure and configured to receive the flow of fluid from the interior region and discharge the flow of fluid into an external environment. The enclosure also includes a mounting bracket configured to removably couple the relief valves to the enclosure, where the mounting bracket includes an opening and the opening is configured to direct the flow of fluid from the interior region to the relief valve.

BRIEF DESCRIPTION OF THE DRAWINGS

Various aspects of this disclosure may be better understood upon reading the following detailed description and upon reference to the drawings in which.

DETAILED DESCRIPTION

Figure 1:
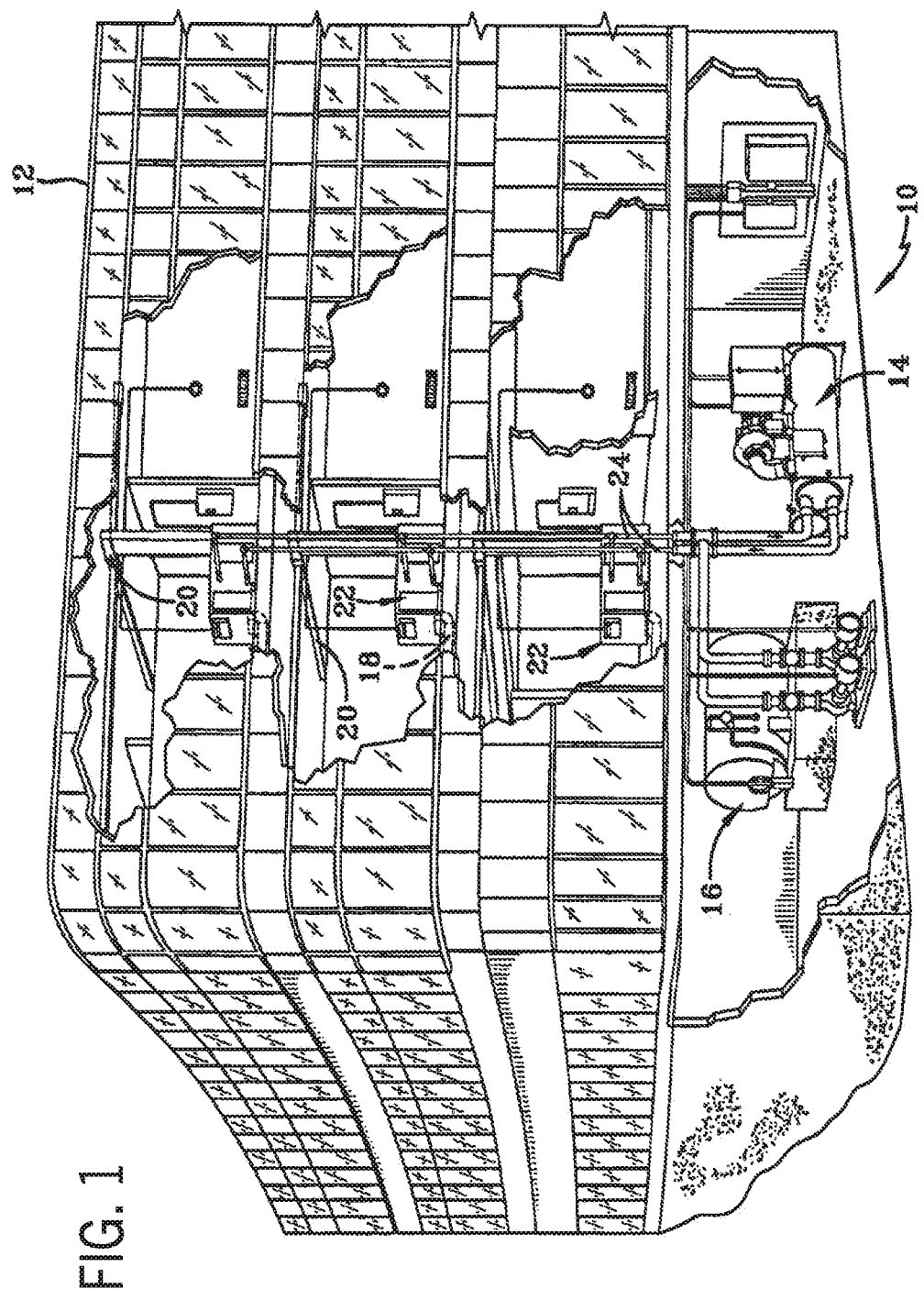
FIG. 1 is a perspective view of an embodiment of a building that may utilize a heating, ventilating, air conditioning, and refrigeration (HVAC&R) system in a commercial setting, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A heating, ventilating, air conditioning, and refrigeration (HVAC&R) system may include a vapor compression system that transfers thermal energy (e.g., heat) between the HVAC&R system and an environment. The vapor compression system may include multiple enclosures configured to protect components of the vapor compression system, such as processing circuitry, from physical damage and/or exposure to contaminants (e.g., dust from the atmosphere). In some cases, the enclosure may be coupled to and/or adjacent to components of the vapor compression system that may be pressurized. As such, the enclosure may receive discharge of a fluid into an interior region of the enclosure from the pressurized components (e.g., due to motor feedthrough). Typical enclosures may include louvers (e.g., perforations, open slots) that may be cut and/or stamped within portions of the enclosure, a cover plate of the enclosure, or both. The louvers may vent the fluid from within the enclosure to the external environment (e.g., the atmosphere) and prevent the enclosure from over-pressurizing. Unfortunately, the louvers may be expensive to produce (e.g., due to machining costs) and/or enable contaminants (e.g., dust) to enter the interior region of the enclosure through the louvers.

Embodiments of the present disclosure are directed to relief valves that may vent the fluid from within the enclosure to the external environment, while blocking contaminants from entering the enclosure. In some cases, the relief valves have a reduced cost than typical devices used to vent the enclosure (e.g., the louvers). The relief valves may be disposed near a lower portion of the enclosure (e.g., the underside of the enclosure), which may block contaminants from accumulating around the relief valves and/or falling into an opening of the relief valves (e.g., due to gravity). This configuration may additionally mitigate incidental removal of the relief valves (e.g., from an operator contacting the relief valves). Furthermore, the relief valves may be configured to enable a moderate positive pressure to be maintained within the enclosure, which may additionally block contaminants from flowing into the enclosure.

Turning now to the drawings, FIG. 1 is a perspective view of an embodiment of an environment for a heating, ventilating, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
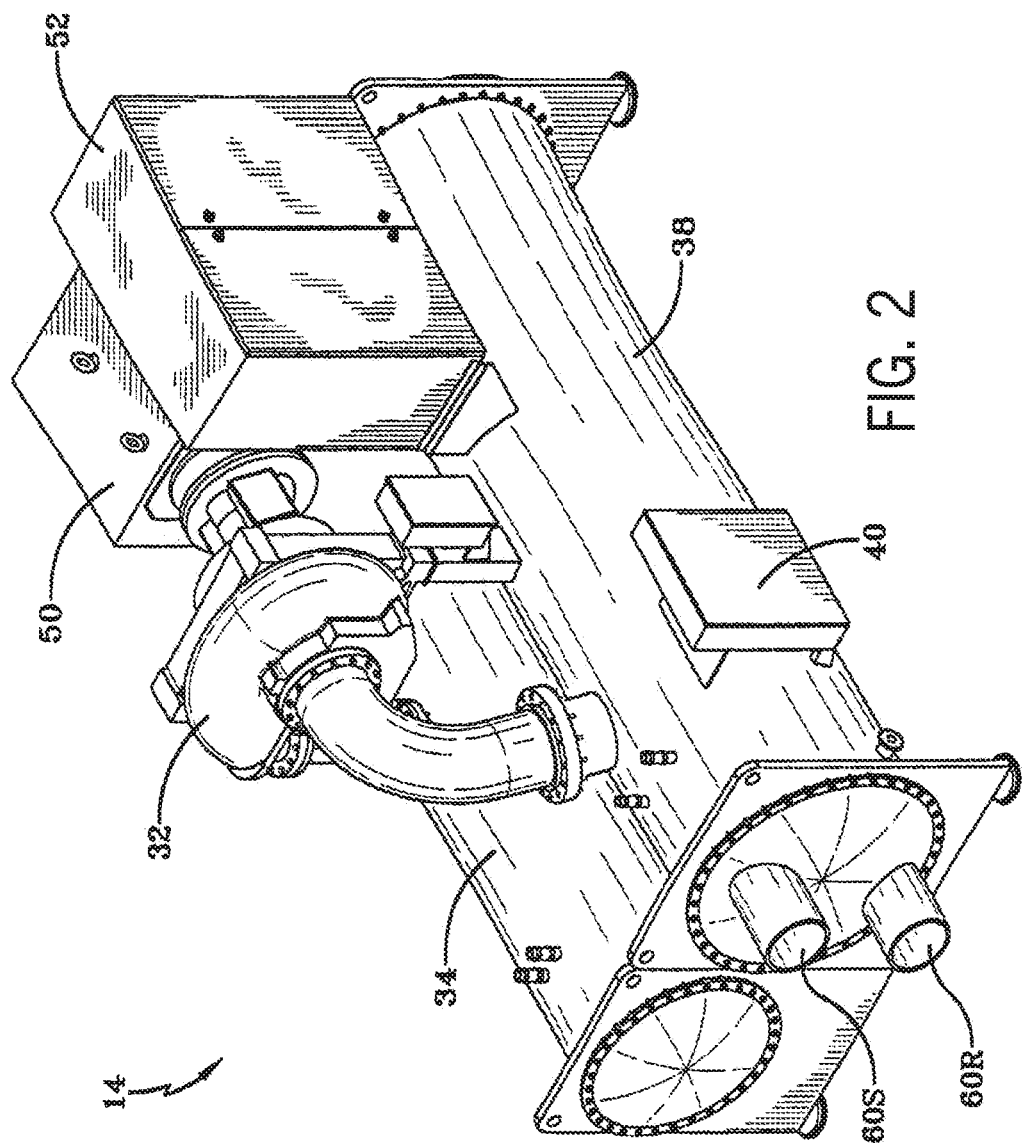
FIG. 2 is a perspective view of a vapor compression system, in accordance with an embodiment of the present disclosure.
Figure 3:
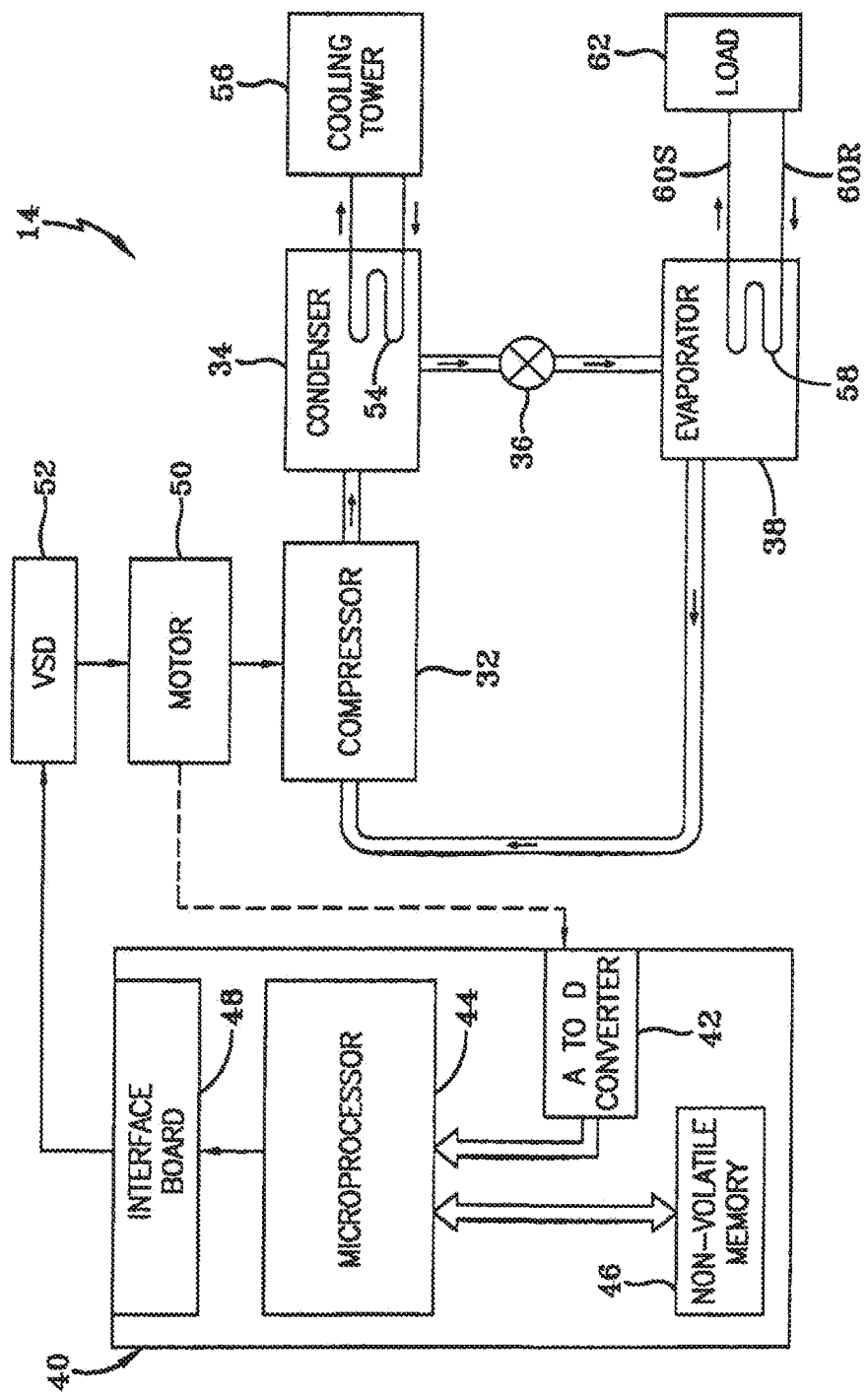
FIG. 3 is a schematic of an embodiment of the vapor compression system of FIG. 2, in accordance with an embodiment of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

Figure 4:
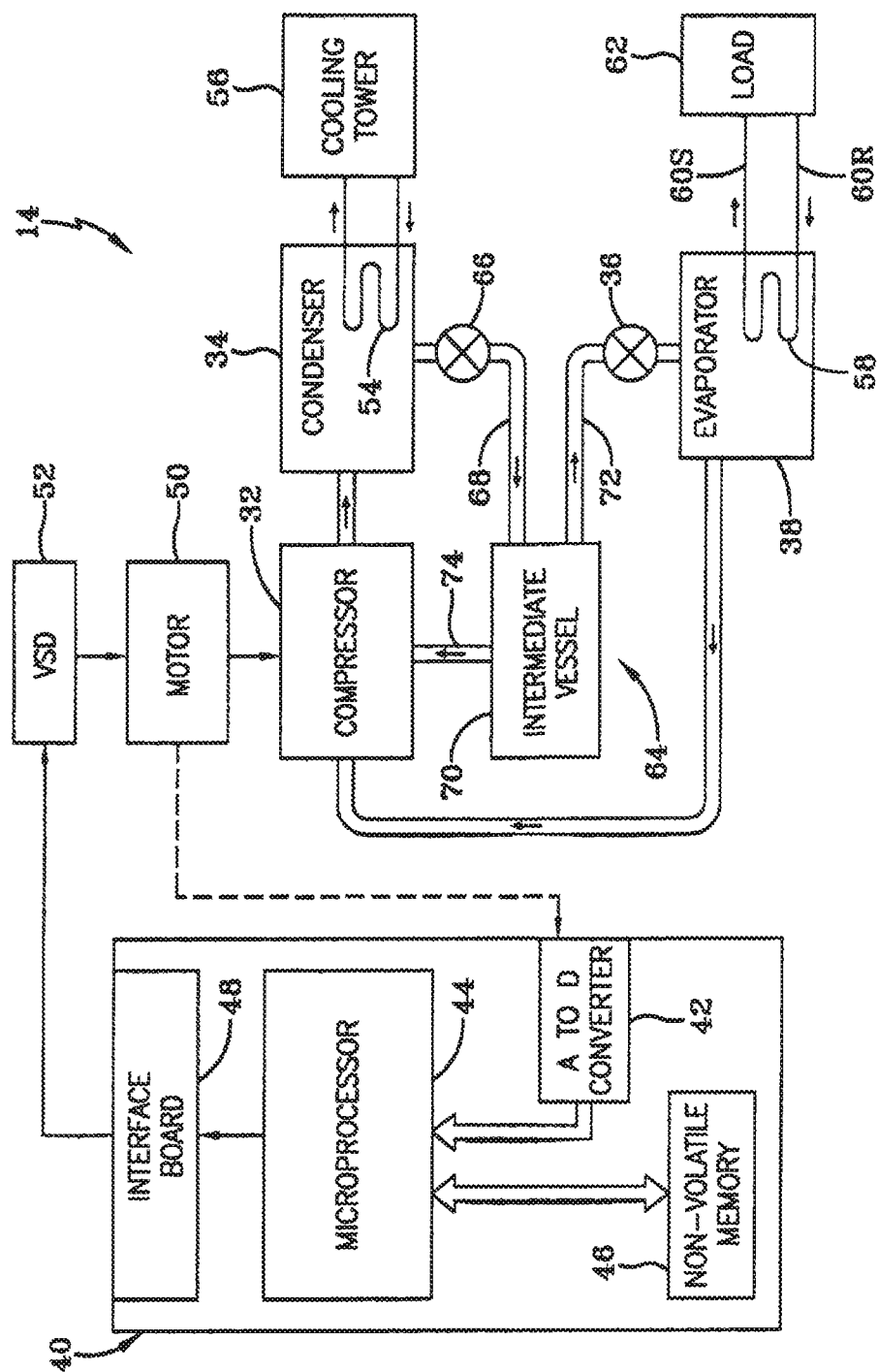
FIG. 4 is a schematic of an embodiment of the vapor compression system of FIG. 2, in accordance with an embodiment of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

In some embodiments, an enclosure may be positioned against components of the vapor compression system 14. For example, the enclosure may be positioned against the motor 50 and configured to couple to a portion of the motor 50. The enclosure may house various electrical components for controlling the motor 50, such as a motor control unit. Thus, the enclosure may prevent contaminants (e.g., dust) from accumulating about the electrical components within the enclosure. In some embodiments, the enclosure may be pressurized with a fluid (e.g., the refrigerant).

Figure 5:
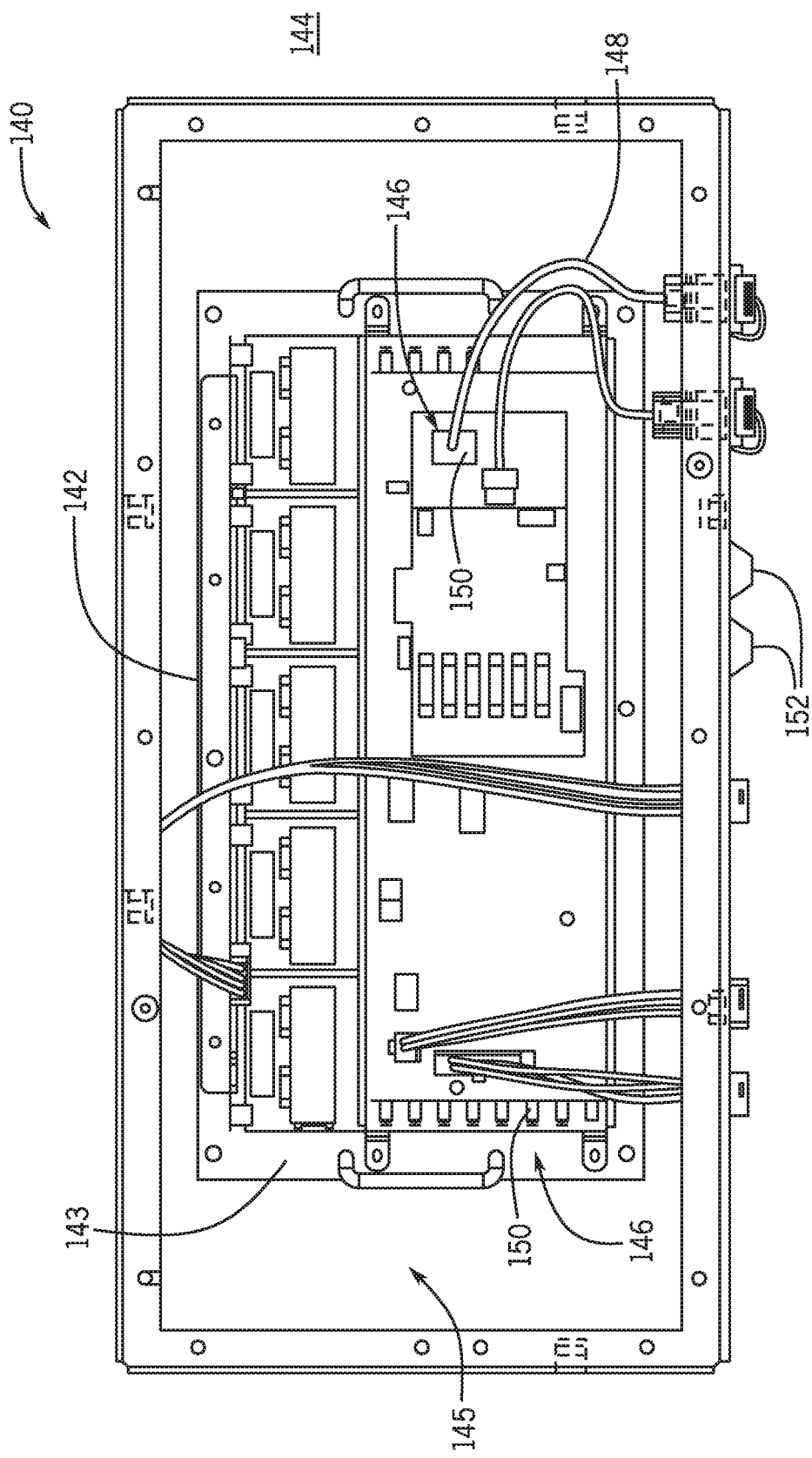
FIG. 5 is front view of an embodiment of an enclosure that may couple to a component or a housing of the vapor compression system of FIG. 2, in accordance with an embodiment of the present disclosure.

As such, FIG. 5 illustrates a front view of an embodiment of an enclosure 140 that may couple to a component of the vapor compression system 14, such as the motor 50. In some embodiments, the enclosure 140 may house a control unit 142 of the motor 50, the control panel 40, and/or any other suitable component of the vapor compression system 14. The control unit 142 may couple to a portion (e.g., an end cap) of the motor 50 and may operate and/or control parameters of the motor 50. For example, the control unit 142 may be configured to adjust a torque of the motor 50, adjust a speed of the motor 50, and/or control the operation of magnetic bearings of the motor 50.

In some embodiments, the motor 50 may be thermally cooled using the refrigerant within the vapor compression system 14. For example, the refrigerant may be circulated through a housing of the motor 50 to cool (e.g., remove heat) the motor 50. In some cases, at least a portion of the control unit 142 may be fluidly coupled to the housing of the motor 50, such that the refrigerant may reach the enclosure 140 via the control unit 142. As such, an interior region 141 (not shown) of the control unit 142 may be pressurized with the refrigerant of the vapor compression system 14.

In some embodiments, the interior region 141 may be pressurized to a pressure substantially equivalent to the pressure of the refrigerant within the vapor compression system 14. In other embodiments, the pressure within the interior region 141 may be less than or greater than the pressure of the refrigerant. As such, a control unit case 143 may serve as a pressure seal between the pressurized interior region 141 and an external environment 144 (e.g. the atmosphere) and/or a space 145 within the enclosure 140. For example, the control unit case 143 may hermetically seal the interior region 141 of the control unit 142 and/or the motor 50 from the external environment 144. As such, the interior region 141 of the control unit 142 may be in fluid communication with the refrigerant of the vapor compression system 14. In some embodiments, this may generate a pressure differential between the refrigerant within the control unit 142 and the external environment 144 (and/or the space 145 within the enclosure 140).

The control unit 142 may include multiple connection ports 146 (e.g., access openings) configured to receive one or more connectors 148 (e.g., wires, conduits, tubing, or another suitable connector). The connectors 148 may be used to operate the control unit 142, the motor 50, and/or subcomponents of the control unit 142. As such, the connection ports 146 may enable the connectors 148 to enter the interior region 141 of the control unit 142. In some embodiments, the connection ports 146 may include seals 150 that may block the pressurized refrigerant within the interior region 141 of the control unit 142 from leaking into the external environment 144 (and/or the space 145 within the enclosure 140) through the connection ports 146. The seals 150 may couple to the connection ports 146 via an adhesive (e.g., bonding glue) and/or a fastener (e.g., a bolt, a screw, or another fastener). Additionally or alternatively, the seals 150 may be press fit into the connection ports 146 and held in place through frictional forces between the connection ports 146 and the seals 150.

In some embodiments, a component (e.g., the motor 50) coupled to the control unit 142 may experience a disruption or abnormality in operation, thereby causing the pressure within the interior region 141 of the control unit 142 to increase. This rise in internal pressure may impose a force upon the seals 150 that exceeds a coupling force between the connection ports 146 and the seals 150. As such, the seals 150 of the connection ports 146 may become unsealed (e.g., tear or disconnect) and enable the pressurized fluid (e.g., the refrigerant) from within the interior region 141 of the control unit 142 to flow into the enclosure 140.

The fluid may discharge from the connection ports 146 enabling the pressure within the space 145 of the enclosure 140 to increase. As such, the pressure within the enclosure 140 may exceed the pressure of the surrounding environment 144 (e.g., greater than 14.7 psi). In some embodiments, the pressure within the enclosure 140 may thereby cause the enclosure 140 to over-pressurize. It should be noted that in certain embodiments, the enclosure 140 may receive a fluid flow from any other suitable component or fluid source of the vapor compression system 14 in addition to, or in lieu of, the connection ports 146. For example, one or more valves, pipes, conduits, flow regulators, flow sensors, or other devices of the vapor compression system 14 may be disposed within the enclosure 140 and configured to discharge a flow of fluid (e.g., refrigerant) during operation to generate pressure within the enclosure 140. In any case, as discussed in greater detail herein, one or more relief valves 152 may be coupled to the enclosure 140 and used to release the fluid and/or pressure from within the enclose 140 and/or prevent an over-pressurization of the enclosure 140.

Figure 6:
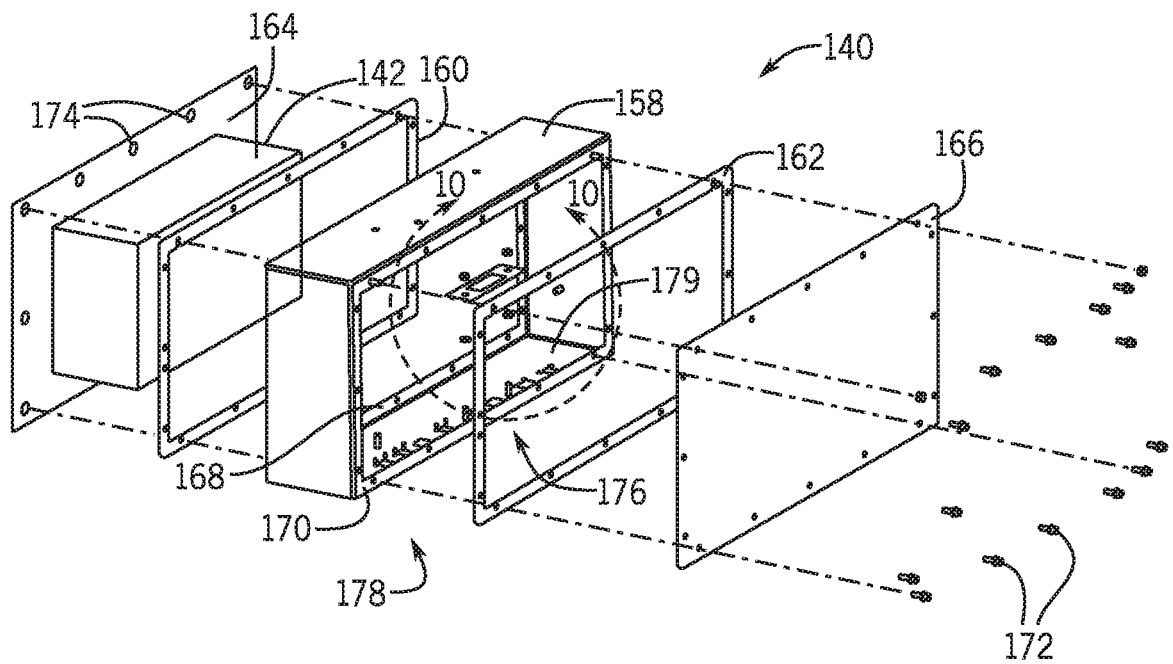
FIG. 6 is an exploded perspective view of an embodiment of the enclosure of FIG. 5, in accordance with an embodiment of the present disclosure.

FIG. 6, is an exploded perspective view of an embodiment of the enclosure 140. The enclosure 140 may include an enclosure case 158, which houses the control unit 142. The enclosure 140 may include one or more seals (e.g., a gasket) configured to block contaminants (e.g., dust) from entering the enclosure 140, such as a first seal 160 and a second seal 162. For example, the first seal 160 may be disposed between a mounting surface 164 of the vapor compression system 114 and the enclosure case 158. In some embodiments, the mounting surface 164 may include a portion and/or housing of the motor 50, the compressor 32, and/or another suitable component of the vapor compression system 14. The second seal 162 may be disposed between the enclosure case 158 and a cover plate 166. In some embodiments, the cover plate 166 may be a solid, one-piece component that does not include holes, perforations, and/or louvers. The first seal 160 and the second seal 162 may rest on a first flange 168 and a second flange 170 of the enclosure case 158, respectively. Although a rectangular enclosure 140 is illustrated in the present embodiments, it should be noted that the enclosure 140 may have any suitable shape or cross section such as oval, circular, triangular, or another prismatic shape.

The first seal 160, the enclosure case 158, the second seal 162, and/or the cover plate 166 may be coupled to the mounting surface 164 via fasteners (e.g., bolts 172, adhesives). In some embodiments, the bolts 172 may extend from the cover plate 166, through the enclosure case 158, and couple to threaded holes 174 disposed within the mounting surface 164. As such, the bolts 172 may extend through the entire enclosure 140 to couple the cover plate 166, the enclosure case 158, the seals 160 and 162, and the mounting surface 164 to one another. In other embodiments, a first set of bolts 172 may extend from the first flange 168 to the threaded holes 174, and fasten the enclosure case 158 and the first seal 160 to the mounting surface 164. As such, a second set of bolts 172 may couple the cover plate 166 and the second seal 162 to the second flange 170 of the enclosure case 158. Thus, the cover plate 166 may be removed from the enclosure case 158 without removing the enclosure 40 from the mounting surface 164. In other embodiments, a combination of the first set of bolts 172 and the second set of bolts 172 set forth above may be used to couple the enclosure 140, the enclosure case 158, and/or the cover plate 166 to the mounting surface 164.

Figure 7:
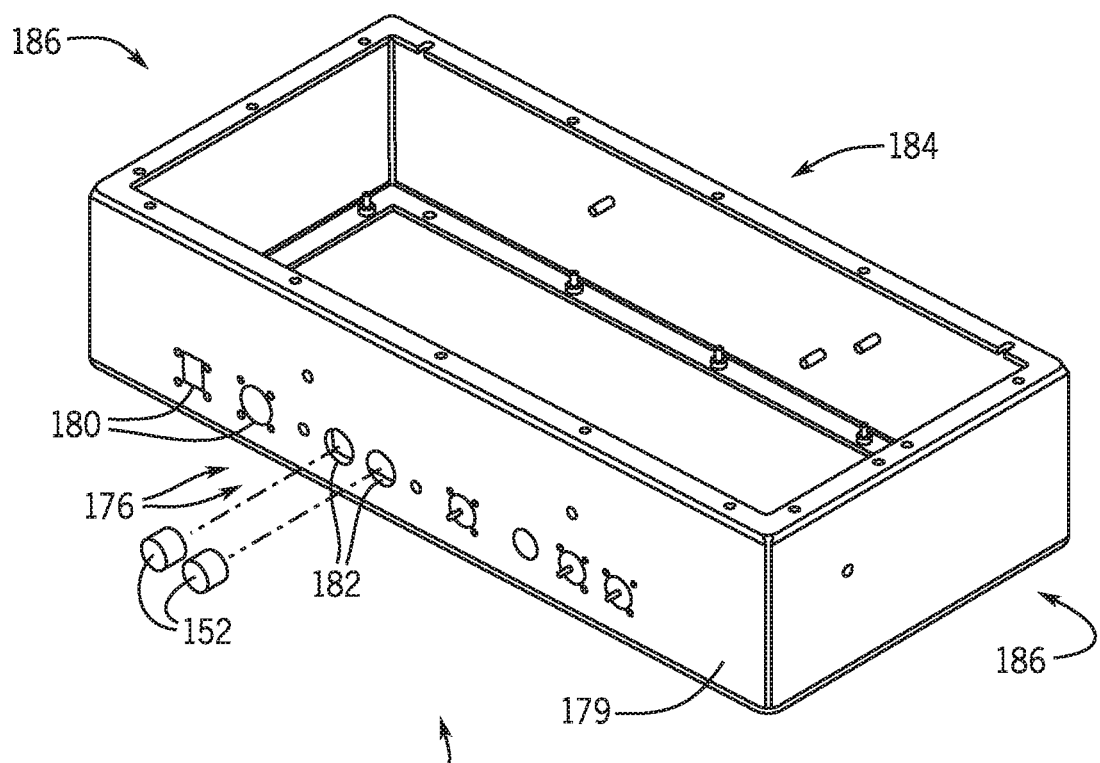
FIG. 7 is a perspective view of an embodiment of the enclosure of FIG. 5, in accordance with an embodiment of the present disclosure.

In some embodiments, the enclosure case 158 may include one or more holes 176 disposed near a bottom portion 178 of the enclosure 140. The one or more holes 176 may be disposed within a bottom plate 179 of the enclosure case 158. As shown in more detail in FIG. 7, the holes 176 may include connector holes 180 configured to receive connectors 148 that couple to the control unit 142 and/or vent holes 182 configured to receive the relief valves 152. The connector holes 180 may be sealed using a sealant (e.g., silicone) to prevent contaminants (e.g., dust) and/or fluid (e.g., air) from entering the enclosure 140 through the connector holes 180. Disposing the connector holes 180 near the bottom portion 178 of the enclosure 140 may decrease a risk of contaminants entering the enclosure 140 through the connector holes 180. Additionally, disposing the connector holes 180 near the bottom portion 178 may avoid inadvertent disconnection of the connectors 148 (e.g., from an operator accidentally contacting the connectors 148). Although the connector holes 180 are disposed within the bottom plate 179 of the enclosure case 158 in the illustrated embodiment of FIG. 7, the connector holes 180 may be disposed within any other portion of the enclosure case 158, such as near a top portion 184 and/or side portions 186.

Figure 8:
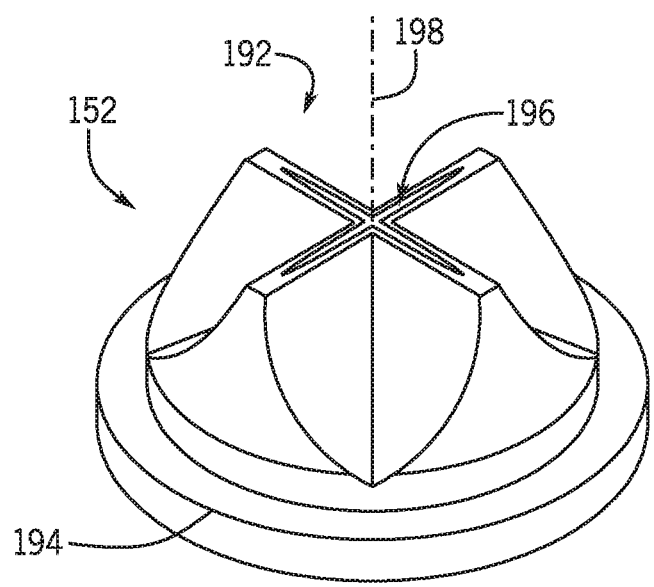
FIG. 8 is a perspective view of an embodiment of a relief valve that may be coupled to the enclosure of FIGS. 5-7, in accordance with an embodiment of the present disclosure.
Figure 9:
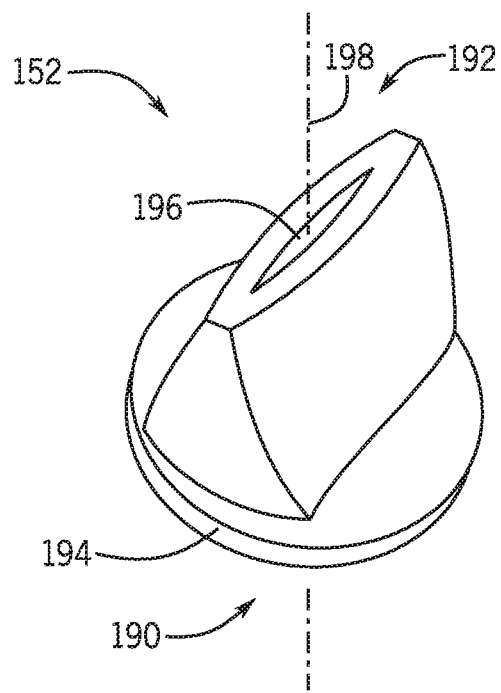
FIG. 9 is a perspective view of an embodiment of the relief valve that may be coupled to the enclosure of FIGS. 5-7, in accordance with an embodiment of the present disclosure.

In some embodiments, the relief valves 152 may include a double duck-bill (e.g., a double slit) shape, as shown in the illustrated embodiment of FIG. 8. Additionally or alternatively, the relief valves 152 may include a single duck-bill shape (e.g., a single slit), as shown in the illustrated embodiment of FIG. 9. In any case, the relief valves 152 may include a first end portion 190 (e.g., an inlet portion) and a second end portion 192 (e.g., an outlet portion). The relief valves 152 may include a flange 194 near the first end portion 190 and one or more slits 196 (e.g., the one or more duck-bills) near the second end portion 192. In some embodiments, the first end portion 190 may be circular in shape or have a circular cross section. As such, the flange 194 may extend radially from a central axis 198 of the relief valves 152. As discussed in greater detail herein, the first end portion 190 of the relief valves 152 may be disposed within the enclosure 140 and the second end portion 192 of the relief valves 152 may be disposed external to the enclosure 140.

The relief valves 152 may include an internal fluid passage, such that a fluid (e.g., the refrigerant) may flow into an inlet of the first end portion 190 of the relief valves 152 and exit through the slits 196 in the second end portion 192 of the relief valves 152. In some embodiments, the slits 196 may open or close in response to a pressure differential between the first end portion 190 (e.g., pressure within the enclosure 140) and the second end portion 192 (e.g., pressure in the environment 144) of the relief valves 152.

For example, the slits 196 may be opened and enable a fluid (e.g., the refrigerant) to flow through the internal fluid passage when a pressure difference between the first end portion 190 and the second end portion 192 exceeds a threshold. In some embodiments, the slits 196 may remain closed and block the fluid from flowing through the internal passage when the pressure difference between the first end portion 190 and the second end portion 192 is below the threshold. Additionally or alternatively, the slits 196 may be configured to remain closed and block the fluid from flowing through the relief valves 152 when the pressure difference between the first end portion 190 and the second end portion 192 is substantially zero. As such, the relief valves 152 may prevent contaminants from entering the enclosure 140 by blocking the flow of fluid from the second end portion 192 (e.g., the portion exterior of the enclosure 140) to the first end portion 190 (e.g., the portion within the enclosure 140).

In some embodiments, the slits 196 may be configured to resist opening and/or enabling the flow of fluid until the threshold is exceeded. For example, the slits 196 may be configured to remain closed and block fluid from flowing out of the enclosure 140 when the pressure differential between an interior region of the enclosure 140 and the external environment 144 is below a threshold value (e.g., 10 psig). As such, once the pressure within the enclosure 140 exceeds the threshold value (e.g., 10 psig), the slits 196 may open and enable the fluid within the enclosure 140 to flow out of the enclosure 140 and into the external environment 144 via the relief valves 152. As such, a slight positive pressure may be maintained within the enclosure 140. The slight positive pressure may additionally reduce the risk of contaminants entering the enclosure 140 through an imperfection in the enclosure 140 (e.g., a puncture or a crack in the enclosure case 158). For example, the slight positive pressure may enable the fluid within the enclosure 140 to continuously flow out of the imperfection, thereby blocking containments (e.g., dust) from entering the enclosure 140 through the imperfection.

In some embodiments, disposing the relief valves 152 near the bottom portion 178 of the enclosure 140 may reduce contaminant build up around the relief valves 152 and/or block contaminants from falling into the slits 196 (e.g., due to gravity), and thus, into the enclosure 140. Disposing the relief valves 152 near the bottom portion 178 may also avoid inadvertent removal or disconnection of the relief valves 152 (e.g., from an operator accidentally contacting the relief valves 152). In some embodiments, the vent holes 182 may be disposed within other portions of the enclosure case 158, such as near the top portion 184 and/or the side portions 186.

Figure 10:
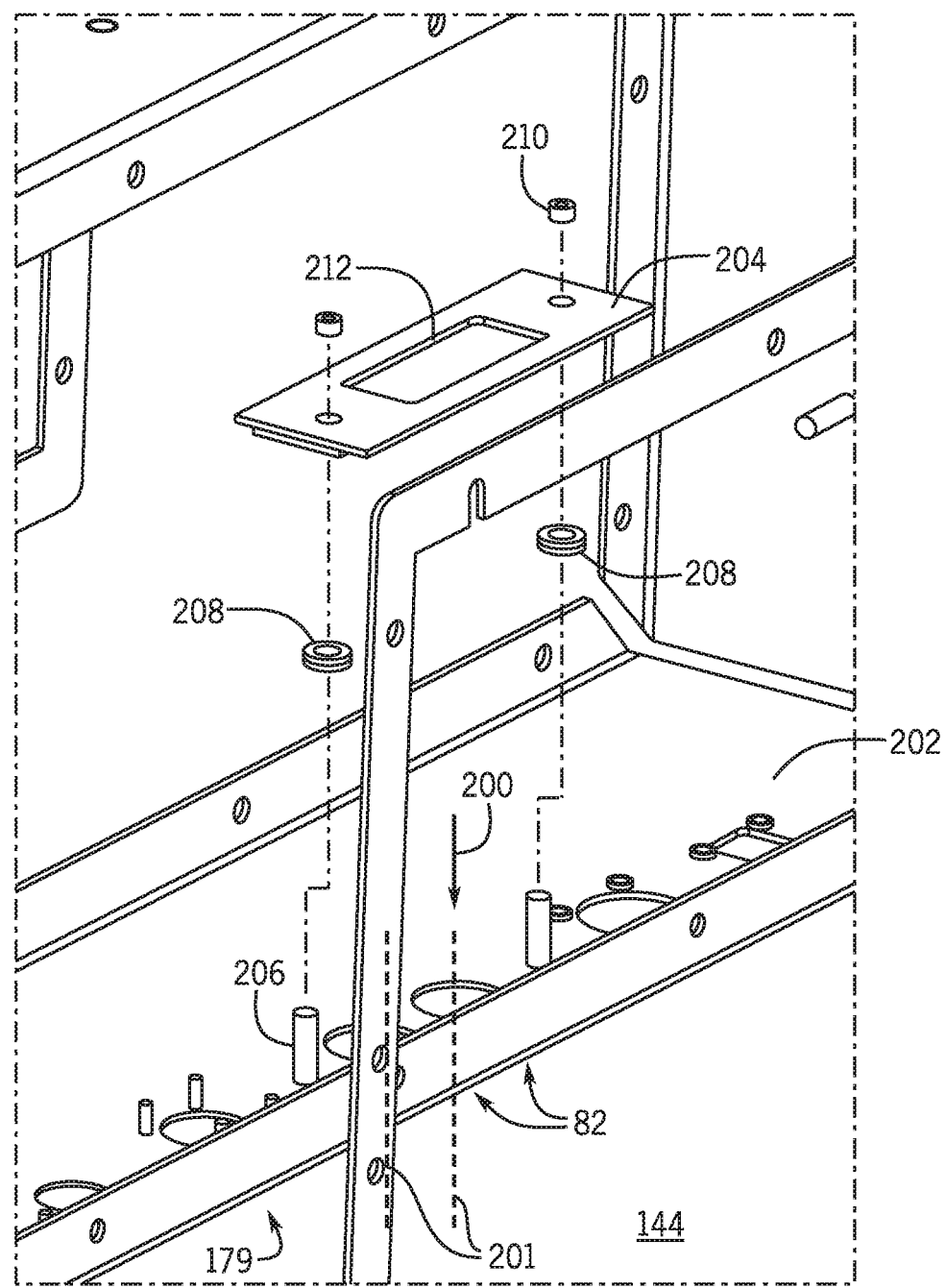
FIG. 10 is an expanded view of line 10-10 of FIG. 6, illustrating a mounting bracket of the enclosure of FIG. 6, in accordance with an embodiment of the present disclosure.

FIG. 10 is an expanded perspective view of the enclosure 140 taken along line 10-10 of FIG. 6. In some embodiments, the relief valves 152 may extend through the vent holes 182 in a first direction 200 along axis 201. The vent holes 182 may be circular and may be configured to accept and/or form a seal (e.g., a press fit) with the circular first end portion 190 of the relief valves 152. The flange 194 of the relief valves 152 may block the relief valves 152 from traversing through (e.g., falling out of the enclosure 140 in the first direction 200) the vent holes 182 in the first direction 200. As such, the flange 194 may rest on an interior surface 202 of the bottom plate 179. As discussed above, in some embodiments, the fluid within the enclosure 140 may flow from within the enclosure 140 through the first end portion 190 of the relief valves 152, the slit 196 within the second end portion 192 of the relief valves 152, and into the external environment 144.

As shown in the illustrated embodiment of FIG. 10, a mounting bracket 204 may be positioned above the relief valves 152 and coupled to supports 206 extending from the interior surface 202. As such, the flange 194 of the relief valves 152 may be disposed between the mounting bracket 204 and the interior surface 202 of the enclosure case 158. This may form a seal (e.g., a press fit) between the flange 194 and the interior surface 202 of the enclosure case 158. The mounting bracket 204 may be held in place by fasteners such as the bolts 172, washers 208, and/or nuts 210. Additionally or alternatively, the mounting bracket 204 may be coupled to the supports 206 via an adhesive (e.g., bonding glue, welding). As such, the flange 194 of the relief valves 152 may be disposed between the interior surface 202 of the bottom plate 179 and the mounting bracket 204, thus securing the relief valves 152 to the enclosure case 158.

As set forth above, the connectors 148 extending through the connector holes 180 may be sealed using the sealant. Therefore, the sealant may block the fluid from within the enclosure 140 from flowing through the connector holes 180 and into the external environment 144. As such, the fluid may flow out of the enclosure 140 through the relief valves 152. The mounting bracket 204 may include an opening 212 that is in fluid communication with the relief valves 152. The opening 212 enables fluid to flow to the relief valves 152, while still providing the mounting bracket 204 with sufficient surface area to secure the relief valves 152 to the interior surface 202. As such, the fluid within the enclosure 140 may vent to the external environment 144 by flowing through the opening 212 and the relief valves 152. The relief valves 152 may release pressure from within the enclosure 140 when the seals 150 of the control unit 142 are removed or disconnected and the pressurized fluid (e.g., the refrigerant) from within (e.g., the interior region 141) and/or behind the control unit 142 enters into the enclosure 140.

In some embodiments, the opening 212 and/or the relief valves 152 may be configured to receive and discharge a volumetric flow rate of fluid that is larger than a volumetric flow rate of refrigerant that may leak from the connection ports 146 when the seals 150 partially or completely disconnect. In some embodiments, an area of openings of the connection ports 146 and the pressure differential between the interior region 141 of the control unit 142 and the external environment 144 may be used to determine the a flow rate of fluid that may be discharged into the enclosure 140 from the connection ports 146. Thus, the opening 212 and the relief valves 152 within the enclosure 140 may be configured to discharge at least this flow rate, or more, thus enabling the enclosure 140 to avoid over pressurization. In some embodiments, it may be determined that a single relief valve (e.g., one of the relief valves 152) may be sufficient to discharge a volumetric flow rate of fluid from the enclosure 140 that is larger than a volumetric flow rate of refrigerant that may leak from the connection ports 146 and/or otherwise maintain a target pressure within the enclosure 140. Nevertheless, an additional relief valve, or multiple additional relief valves, may be coupled to the enclosure 140 and thereby increase a total flow rate of fluid that may be discharged from the enclosure 140. Accordingly, increasing a quantity of relief valves coupled to the enclosure 140 may reduce a respective flow rate of fluid discharging through any particular relief valve in the event that the enclosure 140 becomes pressurized. In some embodiments, reducing a flow rate of fluid through the relief valves 152 may cause the relief valves 152 to operate more effectively and reduce wear (e.g., material fatigue) on the relief valves 152. Although only two relief valves 152 are shown in the illustrated embodiments, the enclosure 140 may include 1, 2, 3, 4, 5, or more than 5 relief valves 152.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. An enclosure of a vapor compression system, comprising:
   a component within the enclosure, wherein the component is fluidly coupled to the vapor compression system, and wherein the component is configured to discharge a flow of fluid;
   a hole within a portion of the enclosure; and
   a relief valve disposed within the hole of the enclosure, wherein the relief valve is configured to discharge the flow of fluid in a first direction through a passage within the relief valve, wherein the passage extends from an interior region of the enclosure to an environment external of the enclosure, wherein the relief valve is configured to block a second flow of fluid through the passage in a second direction, opposite the first direction, and wherein the relief valve is coupled to the enclosure via a mounting bracket, such that the mounting bracket presses the relief valve against a surface of the enclosure to form a seal between the relief valve and the surface.

2. The enclosure of claim 1, wherein the relief valve is configured to block the flow of fluid in the first direction when a pressure within the enclosure is below a threshold value.

3. The enclosure of claim 1, wherein the hole is disposed within a bottom plate of the enclosure.

4. The enclosure of claim 1, wherein the mounting bracket comprises an opening formed therein, and wherein the opening is configured to receive the flow of fluid and to direct the flow of fluid into the passage.

5. The enclosure of claim 1, wherein the enclosure comprises a cover plate removably coupled to the enclosure.

6. The enclosure of claim 5, wherein the cover plate is a solid, single-piece component, and wherein the cover plate does not include perforations, louvers, slots, or any combination thereof.

7. The enclosure of claim 1, wherein the relief valve is configured to discharge the flow of fluid in the first direction through a first end portion of the relief valve and towards a second end portion of the relief valve.

8. The enclosure of claim 7, wherein the first end portion is disposed within the enclosure and the second end portion is disposed exterior to the enclosure.

9. The enclosure of claim 7, wherein the first end portion is circular, and wherein the first end portion comprises a flange that radially extends from a central axis of the relief valve and contacts the surface of the enclosure.

* * * * *